United States Patent
Fahmy et al.

(10) Patent No.: US 12,450,503 B2
(45) Date of Patent: *Oct. 21, 2025

(54) AUTOMATICALLY-GENERATED LABELS FOR TIME SERIES DATA AND NUMERICAL LISTS TO USE IN ANALYTIC AND MACHINE LEARNING SYSTEMS

(71) Applicant: Oracle International Corporation, Redwood Shores, CA (US)

(72) Inventors: Amr Fawzy Fahmy, Foxboro, MA (US); Sreeji Krishnan Das, Fremont, CA (US); Adrienne Wong, Redwood City, CA (US); Jae Young Yoon, San Mateo, CA (US); Dhileeban Kumaresan, Foster City, CA (US); Eric L. Sutton, Naperville, IL (US)

(73) Assignee: Oracle International Corporation, Redwood Shores, CA (US)

( * ) Notice: Subject to any disclaimer, the term of this patent is extended or adjusted under 35 U.S.C. 154(b) by 90 days.

This patent is subject to a terminal disclaimer.

(21) Appl. No.: 18/542,282

(22) Filed: Dec. 15, 2023

(65) Prior Publication Data

US 2024/0119319 A1    Apr. 11, 2024

Related U.S. Application Data

(63) Continuation of application No. 16/856,790, filed on Apr. 23, 2020, now Pat. No. 11,887,015.
(Continued)

(51) Int. Cl.
*G06N 5/04* (2023.01)
*G06F 16/24* (2019.01)
*G06N 20/00* (2019.01)

(52) U.S. Cl.
CPC ............... *G06N 5/04* (2013.01); *G06F 16/24* (2019.01); *G06N 20/00* (2019.01)

(58) Field of Classification Search
CPC ............................ G06F 16/2322; G06N 5/04
See application file for complete search history.

(56) References Cited

U.S. PATENT DOCUMENTS 5,448,476 A    9/1995    Kurokawa et al.
6,298,063 B1    10/2001    Coile et al.
(Continued)

FOREIGN PATENT DOCUMENTS

CN    1097829 A    1/1995
CN    101482944 A    7/2009
(Continued)

OTHER PUBLICATIONS

"OpenStack Compute Administration Manual", Mar. 1, 2011 (Mar. 1, 2011), XP055207492, Retrieved from the Internet: URL:http://web.archive.org/web/20110708071910/http://docs.openstack.org/bexar/openstack-compute/admin/os-compute-admin-book-bexar.pdf [retrieved on Aug. 12, 2015].
(Continued)

*Primary Examiner* — Tarek Chbouki
(74) *Attorney, Agent, or Firm* — Invoke

(57) ABSTRACT

Techniques for performing analytics using automatically generated labels for time series data and numerical lists are disclosed. In some embodiments, a system loads a set of one or more time series datasets. A respective time series dataset may include a set of data points based on varying values of a metric of one or more computing resources over a window of time. The system assigns labels to a subset of the data points in the time series datasets. The label assigned to a given data point may be descriptive of a pattern reflected by the data point relative to other data points in the time series.
(Continued)

The system further identifies a pattern of automatically assigned labels that is indicative of an event affecting the one or more computing resources. Responsive to identifying the pattern of labels, the system may trigger a responsive action.

20 Claims, 7 Drawing Sheets

Related U.S. Application Data

(60) Provisional application No. 62/900,418, filed on Sep. 13, 2019.

(56) References Cited

U.S. PATENT DOCUMENTS

| | | |
|---|---|---|
| 6,438,592 B1 | 8/2002 | Killian |
| 6,597,777 B1 | 7/2003 | Ho |
| 6,643,613 B2 | 11/2003 | Mcgee et al. |
| 6,928,398 B1 | 8/2005 | Fang et al. |
| 6,996,599 B1 | 2/2006 | Anders et al. |
| 7,343,375 B1 | 3/2008 | Dulac |
| 7,529,991 B2 | 5/2009 | Ide et al. |
| 7,672,814 B1 | 3/2010 | Raanan et al. |
| 7,739,143 B1 | 6/2010 | Dwarakanath et al. |
| 7,739,284 B2 | 6/2010 | Aggarwal et al. |
| 7,783,510 B1 | 8/2010 | Gilgur et al. |
| 7,987,106 B1 | 7/2011 | Aykin |
| 8,014,983 B2 | 9/2011 | Crowe et al. |
| 8,200,454 B2 | 6/2012 | Dorneich et al. |
| 8,229,876 B2 | 7/2012 | Roychowdhury |
| 8,234,236 B2 | 7/2012 | Beaty et al. |
| 8,363,961 B1 | 1/2013 | Avidan et al. |
| 8,576,964 B2 | 11/2013 | Taniguchi et al. |
| 8,583,649 B2 | 11/2013 | Ailon et al. |
| 8,635,328 B2 | 1/2014 | Corley et al. |
| 8,650,299 B1 | 2/2014 | Huang et al. |
| 8,676,964 B2 | 3/2014 | Gopalan et al. |
| 8,694,969 B2 | 4/2014 | Bernardini et al. |
| 8,776,066 B2 | 7/2014 | Krishnamurthy et al. |
| 8,880,525 B2 | 11/2014 | Galle et al. |
| 8,930,757 B2 | 1/2015 | Nakagawa |
| 8,949,677 B1 | 2/2015 | Brundage et al. |
| 9,002,774 B2 | 4/2015 | Karlsson |
| 9,053,171 B2 | 6/2015 | Ailon et al. |
| 9,081,857 B1 | 7/2015 | Huet et al. |
| 9,141,914 B2 | 9/2015 | Viswanathan et al. |
| 9,147,167 B2 | 9/2015 | Urmanov et al. |
| 9,195,563 B2 | 11/2015 | Scarpelli |
| 9,218,232 B2 | 12/2015 | Khalastchi et al. |
| 9,292,408 B2 | 3/2016 | Bernstein et al. |
| 9,323,599 B1 | 4/2016 | Iyer et al. |
| 9,323,837 B2 | 4/2016 | Zhao et al. |
| 9,330,119 B2 | 5/2016 | Chan et al. |
| 9,355,357 B2 | 5/2016 | Hao et al. |
| 9,367,382 B2 | 6/2016 | Yabuki |
| 9,389,946 B2 | 7/2016 | Higuchi |
| 9,471,778 B1 | 10/2016 | Seo et al. |
| 9,495,220 B2 | 11/2016 | Talyansky |
| 9,495,395 B2 | 11/2016 | Chan et al. |
| 9,507,718 B2 | 11/2016 | Rash et al. |
| 9,514,213 B2 | 12/2016 | Wood et al. |
| 9,529,630 B1 | 12/2016 | Fakhouri et al. |
| 9,658,910 B2 | 5/2017 | Poola et al. |
| 9,658,916 B2 | 5/2017 | Yoshinaga et al. |
| 9,692,662 B2 | 6/2017 | Chan et al. |
| 9,710,493 B2 | 7/2017 | Wang et al. |
| 9,727,533 B2 | 8/2017 | Thibaux |
| 9,740,402 B2 | 8/2017 | Manoharan et al. |
| 9,779,361 B2 | 10/2017 | Jones et al. |
| 9,811,394 B1 | 11/2017 | Kogias et al. |
| 9,961,571 B2 | 5/2018 | Yang et al. |
| 10,073,906 B2 | 9/2018 | Lu et al. |
| 10,127,695 B2 | 11/2018 | Garvey et al. |
| 10,210,036 B2 | 2/2019 | Iyer et al. |
| 10,331,802 B2 | 6/2019 | Garvey et al. |
| 10,692,255 B2 | 6/2020 | Garvey et al. |
| 10,699,211 B2 | 6/2020 | Garvey et al. |
| 10,885,461 B2 | 1/2021 | Garvey et al. |
| 10,915,830 B2 | 2/2021 | Garvey et al. |
| 11,146,463 B2 | 10/2021 | Tedaldi et al. |
| 11,295,217 B2 | 4/2022 | Herzog |
| 11,404,145 B2 * | 8/2022 | Saripalli ............. A61B 5/7267 |
| 2002/0019860 A1 | 2/2002 | Lee et al. |
| 2002/0092004 A1 | 7/2002 | Lee et al. |
| 2002/0183972 A1 | 12/2002 | Enck et al. |
| 2002/0188650 A1 | 12/2002 | Sun et al. |
| 2003/0149603 A1 | 8/2003 | Ferguson et al. |
| 2003/0154044 A1 | 8/2003 | Lundstedt et al. |
| 2003/0224344 A1 | 12/2003 | Shamir et al. |
| 2004/0088406 A1 | 5/2004 | Corley et al. |
| 2005/0119982 A1 | 6/2005 | Ito et al. |
| 2005/0132030 A1 | 6/2005 | Hopen et al. |
| 2005/0159927 A1 | 7/2005 | Cruz et al. |
| 2005/0193281 A1 | 9/2005 | Ide et al. |
| 2006/0065717 A1 | 3/2006 | Hurwitz et al. |
| 2006/0087962 A1 | 4/2006 | Golia et al. |
| 2006/0106743 A1 | 5/2006 | Horvitz |
| 2006/0106797 A1 | 5/2006 | Srinivasa et al. |
| 2006/0161485 A1 | 7/2006 | Meldahl |
| 2006/0212593 A1 | 9/2006 | Patrick et al. |
| 2006/0287848 A1 | 12/2006 | Li et al. |
| 2007/0011281 A1 | 1/2007 | Jhoney et al. |
| 2007/0150329 A1 | 6/2007 | Brook et al. |
| 2007/0179836 A1 | 8/2007 | Juang et al. |
| 2008/0221974 A1 | 9/2008 | Gilgur et al. |
| 2008/0288089 A1 | 11/2008 | Pettus et al. |
| 2009/0024427 A1 | 1/2009 | Shan |
| 2009/0030752 A1 | 1/2009 | Senturk-Doganaksoy et al. |
| 2009/0198559 A1 | 8/2009 | Wang et al. |
| 2010/0027552 A1 | 2/2010 | Hill |
| 2010/0036857 A1 | 2/2010 | Marvasti et al. |
| 2010/0050023 A1 | 2/2010 | Scarpelli et al. |
| 2010/0082132 A1 | 4/2010 | Marruchella et al. |
| 2010/0082697 A1 | 4/2010 | Gupta et al. |
| 2010/0185499 A1 | 7/2010 | Dwarakanath et al. |
| 2010/0257026 A1 | 10/2010 | Brocklebank |
| 2010/0257133 A1 | 10/2010 | Crowe et al. |
| 2010/0324869 A1 | 12/2010 | Cherkasova et al. |
| 2011/0022879 A1 | 1/2011 | Chavda et al. |
| 2011/0040575 A1 | 2/2011 | Wright et al. |
| 2011/0125894 A1 | 5/2011 | Anderson et al. |
| 2011/0126197 A1 | 5/2011 | Larsen et al. |
| 2011/0126275 A1 | 5/2011 | Anderson et al. |
| 2011/0213788 A1 | 9/2011 | Zhao et al. |
| 2011/0265164 A1 | 10/2011 | Lucovsky et al. |
| 2012/0005359 A1 | 1/2012 | Seago et al. |
| 2012/0051369 A1 | 3/2012 | Bryan et al. |
| 2012/0066389 A1 | 3/2012 | Hegde et al. |
| 2012/0110462 A1 | 5/2012 | Eswaran et al. |
| 2012/0110583 A1 | 5/2012 | Balko et al. |
| 2012/0203823 A1 | 8/2012 | Manglik et al. |
| 2012/0240072 A1 | 9/2012 | Altamura et al. |
| 2012/0254183 A1 | 10/2012 | Ailon et al. |
| 2012/0265881 A1 | 10/2012 | Chen et al. |
| 2012/0278477 A1 | 11/2012 | Terrell et al. |
| 2012/0278663 A1 | 11/2012 | Hasegawa |
| 2012/0296696 A1 | 11/2012 | Cantor et al. |
| 2012/0323988 A1 | 12/2012 | Barzel et al. |
| 2013/0013535 A1 | 1/2013 | Punera et al. |
| 2013/0024173 A1 | 1/2013 | Brzezicki et al. |
| 2013/0080374 A1 | 3/2013 | Karlsson |
| 2013/0103616 A1 | 4/2013 | Hao et al. |
| 2013/0151179 A1 | 6/2013 | Gray |
| 2013/0226320 A1 | 8/2013 | Berg-Sonne et al. |
| 2013/0282891 A1 | 10/2013 | Davis et al. |
| 2013/0326202 A1 | 12/2013 | Rosenthal et al. |
| 2013/0329981 A1 | 12/2013 | Hiroike |
| 2014/0058572 A1 | 2/2014 | Stein et al. |
| 2014/0067757 A1 | 3/2014 | Ailon et al. |
| 2014/0095422 A1 | 4/2014 | Solomon et al. |
| 2014/0101119 A1 | 4/2014 | Li et al. |
| 2014/0101300 A1 | 4/2014 | Rosensweig et al. |
| 2014/0143401 A1 | 5/2014 | Carlen et al. |

(56) References Cited

U.S. PATENT DOCUMENTS

| | | | |
|---|---|---|---|
| 2014/0156557 A1 | 6/2014 | Zeng et al. | |
| 2014/0215470 A1 | 7/2014 | Iniguez | |
| 2014/0310235 A1 | 10/2014 | Chan et al. | |
| 2014/0310714 A1 | 10/2014 | Chan et al. | |
| 2014/0325649 A1 | 10/2014 | Zhang | |
| 2014/0379717 A1 | 12/2014 | Urmanov et al. | |
| 2015/0032775 A1 | 1/2015 | Yang et al. | |
| 2015/0033084 A1 | 1/2015 | Sasturkar et al. | |
| 2015/0040142 A1 | 2/2015 | Cheetancheri et al. | |
| 2015/0046123 A1 | 2/2015 | Kato | |
| 2015/0046920 A1 | 2/2015 | Allen | |
| 2015/0065121 A1 | 3/2015 | Gupta et al. | |
| 2015/0180734 A1 | 6/2015 | Maes et al. | |
| 2015/0205691 A1 | 7/2015 | Seto | |
| 2015/0234869 A1 | 8/2015 | Chan et al. | |
| 2015/0242243 A1 | 8/2015 | Balakrishnan et al. | |
| 2015/0244597 A1 | 8/2015 | Maes et al. | |
| 2015/0248446 A1 | 9/2015 | Nordstrom et al. | |
| 2015/0251074 A1 | 9/2015 | Ahmed et al. | |
| 2015/0254330 A1 | 9/2015 | Chan et al. | |
| 2015/0296030 A1 | 10/2015 | Maes et al. | |
| 2015/0302318 A1 | 10/2015 | Chen et al. | |
| 2015/0309840 A1 | 10/2015 | Ding et al. | |
| 2015/0312274 A1 | 10/2015 | Bishop et al. | |
| 2015/0317589 A1 | 11/2015 | Anderson et al. | |
| 2015/0371144 A1 | 12/2015 | Engle | |
| 2015/0377938 A1 | 12/2015 | Bansal et al. | |
| 2016/0034328 A1 | 2/2016 | Poola et al. | |
| 2016/0042289 A1 | 2/2016 | Poola et al. | |
| 2016/0062950 A1 | 3/2016 | Brodersen et al. | |
| 2016/0071517 A1 | 3/2016 | Beaver et al. | |
| 2016/0092516 A1 | 3/2016 | Poola et al. | |
| 2016/0105327 A9 | 4/2016 | Cremonesi et al. | |
| 2016/0139964 A1 | 5/2016 | Chen et al. | |
| 2016/0171037 A1 | 6/2016 | Mathur et al. | |
| 2016/0253381 A1 | 9/2016 | Kim et al. | |
| 2016/0283533 A1 | 9/2016 | Urmanov et al. | |
| 2016/0292611 A1 | 10/2016 | Boe et al. | |
| 2016/0294773 A1 | 10/2016 | Yu et al. | |
| 2016/0299938 A1 | 10/2016 | Malhotra et al. | |
| 2016/0299961 A1 | 10/2016 | Olsen | |
| 2016/0321588 A1 | 11/2016 | Das et al. | |
| 2016/0342909 A1 | 11/2016 | Chu et al. | |
| 2016/0357674 A1 | 12/2016 | Waldspurger et al. | |
| 2016/0378809 A1 | 12/2016 | Chen et al. | |
| 2017/0061297 A1 | 3/2017 | Joshi et al. | |
| 2017/0061321 A1 | 3/2017 | Maiya et al. | |
| 2017/0249376 A1 | 8/2017 | Garvey et al. | |
| 2017/0249563 A1 | 8/2017 | Garvey et al. | |
| 2017/0249564 A1 | 8/2017 | Garvey et al. | |
| 2017/0249648 A1 | 8/2017 | Garvey et al. | |
| 2017/0249649 A1 | 8/2017 | Garvey et al. | |
| 2017/0249763 A1 | 8/2017 | Garvey et al. | |
| 2017/0262223 A1 | 9/2017 | Dalmatov et al. | |
| 2017/0284903 A1 | 10/2017 | Anderson et al. | |
| 2017/0329660 A1 | 11/2017 | Salunke et al. | |
| 2017/0351563 A1 | 12/2017 | Miki et al. | |
| 2017/0364851 A1 | 12/2017 | Maheshwari et al. | |
| 2018/0026907 A1 | 1/2018 | Miller et al. | |
| 2018/0039555 A1 | 2/2018 | Salunke et al. | |
| 2018/0052804 A1 | 2/2018 | Mikami et al. | |
| 2018/0053207 A1 | 2/2018 | Modani et al. | |
| 2018/0059628 A1 | 3/2018 | Yoshida | |
| 2018/0081629 A1 | 3/2018 | Kuhhirte et al. | |
| 2018/0219889 A1 | 8/2018 | Oliner et al. | |
| 2018/0268152 A1 | 9/2018 | Cuomo et al. | |
| 2018/0321989 A1 | 11/2018 | Shetty et al. | |
| 2018/0324199 A1 | 11/2018 | Crotinger et al. | |
| 2018/0330433 A1 | 11/2018 | Frenzel et al. | |
| 2018/0349797 A1 | 12/2018 | Garvey et al. | |
| 2018/0351786 A1 | 12/2018 | Pope et al. | |
| 2019/0042982 A1 | 2/2019 | Qu et al. | |
| 2019/0065275 A1 | 2/2019 | Wong et al. | |
| 2019/0121808 A1 | 4/2019 | Chadha et al. | |
| 2019/0163806 A1* | 5/2019 | Bauer | G06F 16/285 |
| 2019/0305876 A1 | 10/2019 | Sundaresan et al. | |
| 2019/0379589 A1 | 12/2019 | Ryan et al. | |
| 2019/0392098 A1 | 12/2019 | Mehta et al. | |
| 2020/0027024 A1* | 1/2020 | Aggarwal | G16H 40/63 |
| 2020/0034745 A1 | 1/2020 | Nagpal et al. | |
| 2020/0125471 A1* | 4/2020 | Garvey | G06F 18/217 |
| 2020/0125988 A1 | 4/2020 | Garvey et al. | |
| 2020/0337648 A1* | 10/2020 | Saripalli | G06N 20/00 |
| 2020/0387797 A1 | 12/2020 | Ryan et al. | |
| 2021/0028973 A1 | 1/2021 | Ct et al. | |
| 2021/0257060 A1 | 8/2021 | Curtis et al. | |
| 2022/0138624 A1* | 5/2022 | Mizoguchi | G06F 18/213 706/15 |

FOREIGN PATENT DOCUMENTS

| | | |
|---|---|---|
| CN | 103984938 A | 8/2014 |
| CN | 105144112 A | 12/2015 |
| CN | 105426411 A | 3/2016 |
| CN | 109359763 A | 2/2019 |
| EP | 2984568 A1 | 2/2016 |
| JP | 2006-129446 A | 5/2006 |
| WO | 2011/071624 A2 | 6/2011 |
| WO | 2013/016584 A1 | 1/2013 |
| WO | 2014/168981 A1 | 10/2014 |
| WO | 2014/169056 A1 | 10/2014 |

OTHER PUBLICATIONS

"OpenStack Object Storage Administrator Manual", Jun. 2, 2011 (Jun. 2, 2011), XP055207490, Retrieved from the Internet: URL:http://web.archive.org/web/20110727190919/http://docs.openstack.org/cactus/openstack-object-storage/admin/os-objectstorage-adminguide-cactus.pdf [retrieved on Aug. 12, 2015].

"Time Series Pattern Search: A tool to extract events from time series data", available online at <https://www.ceadar.ie/pages/time-series-pattern-search/>, retrieved on Apr. 24, 2020, 4 pages.

Ahmed, Reservoir-based network traffic stream summarization for anomaly detection, Article in Pattern Analysis and Applications, Oct. 2017.

Alberto Zuin: "OpenNebula Setting up High Availability in OpenNebula with LVM", May 2, 2011 (May 2, 2011), XP055207701, Retrieved from the Internet: URL:http://opennebula.org/setting-up-highavailability-in-opennebula-with-lvm/ [retrieved on Aug. 13, 2015] p. 1.

Andrew Beekhof: "Clusters from Scratch—Apache, DRBD and GFS2 Creating Active/Passive and Active/Active Clusters on Fedora 12", Mar. 11, 2010 (Mar. 11, 2010), XP055207651, Retrieved from the Internet: URL:http://clusterlabs.org/doc/en-US/Pacemaker/1.0/pdf/Clusters from Scratch/Pacemaker-1.0-Clusters from Scratch-en-US.pdi [retrieved on Aug. 13, 2015].

Anonymous: "High Availability for the Ubuntu Enterprise Cloud (UEC) - Cloud Controller (CLC)", Feb. 19, 2011 (Feb. 19, 2011), XP055207708, Retrieved from the Internet: URL:http://blog.csdn.net/superxgl/article/details/6194473 [retrieved on Aug. 13, 2015] p. 1.

Carvalho et al., "Long-term SLOs for reclaimed cloud computing resources," 2014, In Proceedings of the ACM Symposium on Cloud Computing (SOCC '14). Association for Computing Machinery, New York, NY, USA, 1-13 (Year: 2014).

Charapko, Gorilla—Facebook's Cache for Time Series Data, http://charap.co/gorilla-facebooks-cache-for-monitoring-data/, Jan. 11, 2017.

Chris Bunch et al: "AppScale: Open-Source Platform-As-A-Service", Jan. 1, 2011 (Jan. 1, 2011), XP055207440, Retrieved from the Internet: URL:http://128.111.41.26/research/tech reports/reports/2011-01 .pdf [retrieved on Aug. 12, 2015] pp. 2-6.

Chu, "A Piecewise Linear Approach to Modeling and Forecasting Demand for Macau Tourism," in 32 Tourism Mgmt. 1414-20 (2011). (Year: 2011).

Davies, David L., et al., "A Cluster Separation measure", IEEE Transactions on Pattern Analysis and Machine Intelligence, vol. PAMI-1, No. 2, Apr. 1979, pp. 224-227.

Esling et al., "Time-Series Data Mining," in 45.1 ACM Computing Surveys 1-34 (2012). (Year: 2012).

(56) References Cited

OTHER PUBLICATIONS

Faraz Rasheed, "A Framework for Periodic Outlier Pattern Detection in Time-Series Sequences," May 2014, IEEE.
Ghosh, "Biting off safely more than you can chew: Predictive analytics for resource over-commit in iaas cloud," 2012, In 2012 IEEE Fifth International Conference on Cloud Computing, pp. 25-32 (Year: 2012).
Greenwald et al. "Space-efficient online computation of quantile summaries." ACM Proceedings of the 2001 SIGMOD international conference on Management of data pp. 58-66.
Greunen, "Forecasting Methods for Cloud Hosted Resources, a comparison," 2015, 11th International Conference on Network and Service Management (CNSM), pp. 29-35 (Year: 2015).
Guajardo, et al., "A model updating strategy for predicting time series with seasonal patterns" Applied Soft Computing, vol. 10 No. 1, 2010, pp. 276-283.
Gueyoung Jung et al: "Performance and availability aware regeneration for cloud based multitier applications", Dependable Systems and Networks (DSN), 2010 IEEE/IFIP International Conference ON, IEEE, Piscataway, NJ, USA, Jun. 28, 2010 (Jun. 28, 2010), pp. 497-506.
Gunter et al., Log Summarization and Anomaly Detection for Troubleshooting Distributed Systems, Conference: 8th IEEE/ACM International Conference on Grid Computing (GRID 2007), Sep. 19-21, 2007, Austin, Texas, USA, Proceedings.
Hao et al., Visual Analytics of Anomaly Detection in Large Data Streams, Proc. SPIE 7243, Visualization and Data Analysis 2009, 10 pages.
Haugen et al., "Extracting Common Time Trends from Concurrent Time Series: Maximum Autocorrelation Factors with Applications", Stanford University, Oct. 20, 2015, pp. 1-38.
Herbst, "Self-adaptive workload classification and forecasting for proactive resource provisioning", 2014, ICPE'13, pp. 187-198 (Year: 2014).
Jain and Chlamtac, P-Square Algorithm for Dynamic Calculation of Quantiles and Histograms Without Storing Observations, ACM, Oct. 1985 (10 pages).
Jarvis, R. A., et al., "Clustering Using a Similarity Measure Based on Shared Neighbors", IEEE Transactions on Computers, vol. C-22, No. 11, Nov. 1973, pp. 1025-1034.
Kuhn, Markus, A summary of the international standard date and time notation (https://www.cl.cam.ac.uk/~mgk25/iso-time.html), date retrieved from web.archive.org Oct. 13, 2018, 5 pages (Year: 2018).
Laptev, "Generic and scalable framework for automated time-series anomaly detection," 2015, In Proceedings of the 21th ACM SIGKDD international conference on knowledge discovery and data mining, pp. 1939-1947 (Year: 2015).
Lehmann, "Variability of Atmospheric Circulation Patterns Associated With Large Volume Changes of the Baltic Sea", Adv. Sci. Res., 12, 219-225, 2015, WWW.ADV-SCI-RES.NET/12/219/2015/DOI: 10.5.194/ASR-12-219-2015 (Year: 2015).
Li et al., "Forecasting Web Page Views: Methods and Observations," in 9 J. Machine Learning Res. 2217-50 (2008). (Year: 2008).
Lin, Xuemin, et al. "Continuously maintaining quantile summaries of the most recent n elements over a data stream," IEEE, 2004.
Morgan, Derek P., Chapter 4: ISO 8601 Dates, Times, Datetimes, Durations, and Functions, The Essential Guide to SAS Dates and Times, Second Edition, Dec. 2014, 40 pages (Year: 2014).

Niino, Junichi, "Open Source Cloud infrastructure 'OpenStack', its History and Scheme", available online at <http://www.publickey1.jp/blog/11/openstack_1.html>, Jun. 13, 2011, 8 pages.
NPL: Web document dated Feb. 3, 2011, Title: OpenStack Compute, Admin Manual.
Nurmi D et al: "The Eucalyptus Open-Source Cloud-Computing System", Cluster Computing and the Grid, 2009. CCGRID '09. 9th IEEE/ACM International Symposium On, IEEE, Piscataway, NJ, USA, May 18, 2009 (May 18, 2009), pp. 124-131.
Qiu, Hai, et al. "Anomaly detection using data clustering and neural networks." Neural Networks, 2008. IJCNN 2008.(IEEE World Congress on Computational Intelligence). IEEE International Joint Conference on. IEEE, 2008.
Slipetskyy, Rostyslav, "Security Issues in OpenStack", Master's Thesis, Technical University of Denmark, Jun. 2011, 90 pages.
Somlo, Gabriel, et al., "Incremental Clustering for Profile Maintenance in Information Gathering Web Agents", AGENTS '01, Montreal, Quebec, Canada, May 28-Jun. 1, 2001, pp. 262-269.
Suntinger, "Trend-based similarity search in time-series data," 2010, Second International Conference on Advances in Databases, Knowledge, and Data Applications, IEEE, pp. 97-106 (Year: 2010).
Szmit et al., "Usage of Modified Holt-Winters Method in the Anomaly Detection of Network Traffic: Case Studies", Journal of Computer Networks and Communications, vol. 2012, Article ID 192913, Mar. 29, 2012, pp. 1-5.
Taylor et al., "Forecasting Intraday Time Series With Multiple Seasonal Cycles Using Parsimonious Seasonal Exponential Smoothing", OMEGA, vol. 40, No. 6, Dec. 2012, pp. 748-757.
Toreti, "A Novel Approach for the Detection of Inhomogeneities Affecting Climate Time Series", Journal of Applied Meteorology and Climatology, vol. 51, Feb. 2012, DOI: 10.1175/JAMC-D-10-05033.1 (Year: 2012).
Voras et al., "Criteria for evaluation of Open Source Cloud Computing Solutions", Information Technology Interfaces (ITI), Proceedings of the ITI 2011 33rd International Conference on Information Technology Interfaces, US, IEEE, Jun. 27-30, 2011, pp. 137-142.
Voras I et al: "Evaluating open-source cloud computing solutions", MIPRO, 2011 Proceedings of the 34th International Convention, IEEE, May 23, 2011 (May 23, 2011), pp. 209-214.
Wang, "Online Monitoring and Prediction of Complex Time Series Events from Nonstationary Time Series Data," doctoral dissertation, Rutgers U. (2012). (Year: 2012).
Wilks, Samuel S. "Determination of sample sizes for setting tolerance limits," The Annals of Mathematical Statistics 12.1 (1941): 91-96.
Willy Tarreau: "HAProxy Architecture Guide", May 25, 2008 (May 25, 2008), XP055207566, Retrieved from the Internet: URL:http://www.haproxy.org/download/1.2/doc/architecture.txt [retrieved on Aug. 13, 2015].
Yin, "System resource utilization analysis and prediction for cloud based applications under bursty workloads," 2014, Information Sciences, vol. 279, pp. 338-357 (Year: 2014).
Zhai, "Spatial Variation and Trends in PDSI and SPI Indices and Their Relation To Streamflow In 10 Large Regions of China", 2010, Journal of Climate, vol. 23, 2010 American Meteorological Society, DOI: 10.1175/2009JCLI2968.1 (Year: 2010).

\* cited by examiner

LOG EXPLORER: UNTITLED

[ 1 LOG GROUP(S) ▽ ]

→ 402

'LOG SOURCE' = 'FA CUSTOM APPS SERVER ACCESSLOGS' AND LABEL! = NULL
| LINK ENTITY
| STATS AVG (DURATION) AS DURATION
| ADDFIELDS
    [STATUS = '500'
        |STATS COUNT AS 'STATUS 500 COUNT'
    ],
    [LABEL = 'HTTP ERROR'
        |STATS COUNT AS 'HTTP ERROR COUNT'
    ],
    [LABEL = 'APPLICATION ERROR'
        |STATS COUNT AS 'APPLICATION ERROR COUNT'
    ],
| TIMECHART 'ALERT EVENT' = IF('STATUS 500 COUNT'>50,
    'TOO MANY 500 ERRORS',
    IF(VALLEY('APPLICATION ERROR COUNT'),
        'APPLICATION ERROR VALLEY',
        IF (PEAK('HTTP ERROR COUNT'),
            'HTTP ERROR PEAK',
            NULL)))

× ② (RUN)

SAVE SEARCH

*SEARCH NAME [ ADD DESCRIPTION ]
☐ ADD DESCRIPTION
☑ CREATE ALERT RULE

*RULE NAME [ ADD DESCRIPTION ]
ENABLE RULE ☑
CONDITION TYPE [FIXED THRESHOLD ▽]
⊙ *RESULTS [> ▽] WARNING THRESHOLD [ ] CRITICAL THRESHOLD [ ]
SCHEDULE INTERVAL [EVERY HOUR ▽]
☑ EXCLUDE [WEEKEND ▽] [AMERICA/LOS_ANGELES ▽]

▷ NOTIFICATIONS

[ SAVE ] [ CANCEL ]

502 → (near RULE NAME area)
504 → (near SCHEDULE INTERVAL area)
500

FIG. 5

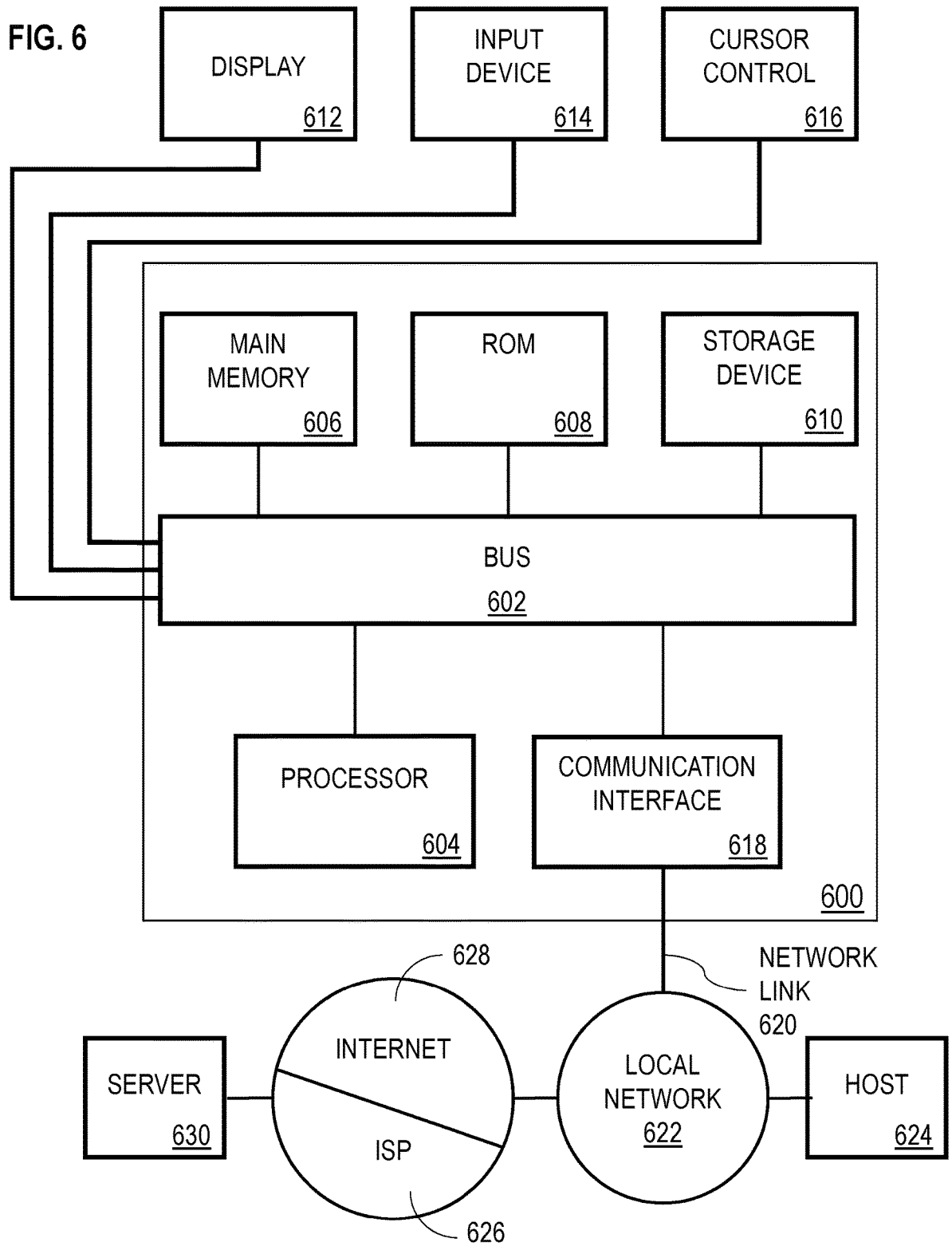

AUTOMATICALLY-GENERATED LABELS FOR TIME SERIES DATA AND NUMERICAL LISTS TO USE IN ANALYTIC AND MACHINE LEARNING SYSTEMS

INCORPORTION BY REFERENCE; DISCLAIMER

Each of the following applications are hereby incorporated by reference: application Ser. No. 16/856,790 filed on Apr. 23, 2020; Application No. 62/900,418, filed Sep. 13, 2019. The applicant hereby rescinds any disclaimer of claims scope in the parent application(s) or the prosecution history thereof and advises the USPTO that the claims in the application may be broader than any claim in the parent application(s).

TECHNICAL FIELD

The present disclosure relates to query analytic and machine learning systems that operate on time-series data. In particular, the present disclosure relates to techniques for leveraging automatically generated labels to enhance analytics on and optimization of computing resource metrics.

BACKGROUND

A time series dataset is typically represented in two dimensions: one dimension representing time and another dimension representing numerical data points. For example, a time series dataset may track processor utilization of a server over a fixed window of time where each respective data point in the dataset indicates a respective measured utilization rate at a different point in time within the fixed window. These data points may provide useful information about the behavior of the underlying system, such as when the processor utilization rate is prone to spikes and drop offs. A monitoring system may be configure to track several other metric time series, such as memory throughput, active database sessions, input/output (I/O) operations, server requests, and server response times.

Analytic and machine learning systems may operate on raw time series datasets to learn behavioral patterns and trigger appropriate response. For example, anomaly detection systems may monitor processor utilization over time to learn normal patterns and identify abnormal behavior. If anomalous behavior is detected, then the anomaly detection system may raise an alarm to alert a system administrator, allowing for a quicker response to ameliorate potential harm to the system. As another example, a forecasting system may project future values based on patterns extracted from a metric timeseries. The projections may be useful to plan for future events.

Time series analytics and machine learning models are typically implemented as internal structures that operate within the bounds of the application to which they are tied. For example, an anomaly detection system may use statistical analysis and machine learning to detect anomalies. However, the algorithms used to detect anomalies are generally difficult to understand and do not contribute to meaningful interpretation in contexts outside of the specific application for which the system was designed.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 4 illustrates an example interface for defining queries in accordance with some embodiments;

FIG. 5 illustrates an example interface for establishing alerts in accordance with some embodiments; and FIG. 6 shows a block diagram that illustrates a computer system in accordance with one or more embodiments.

DETAILED DESCRIPTION

Figure 1:
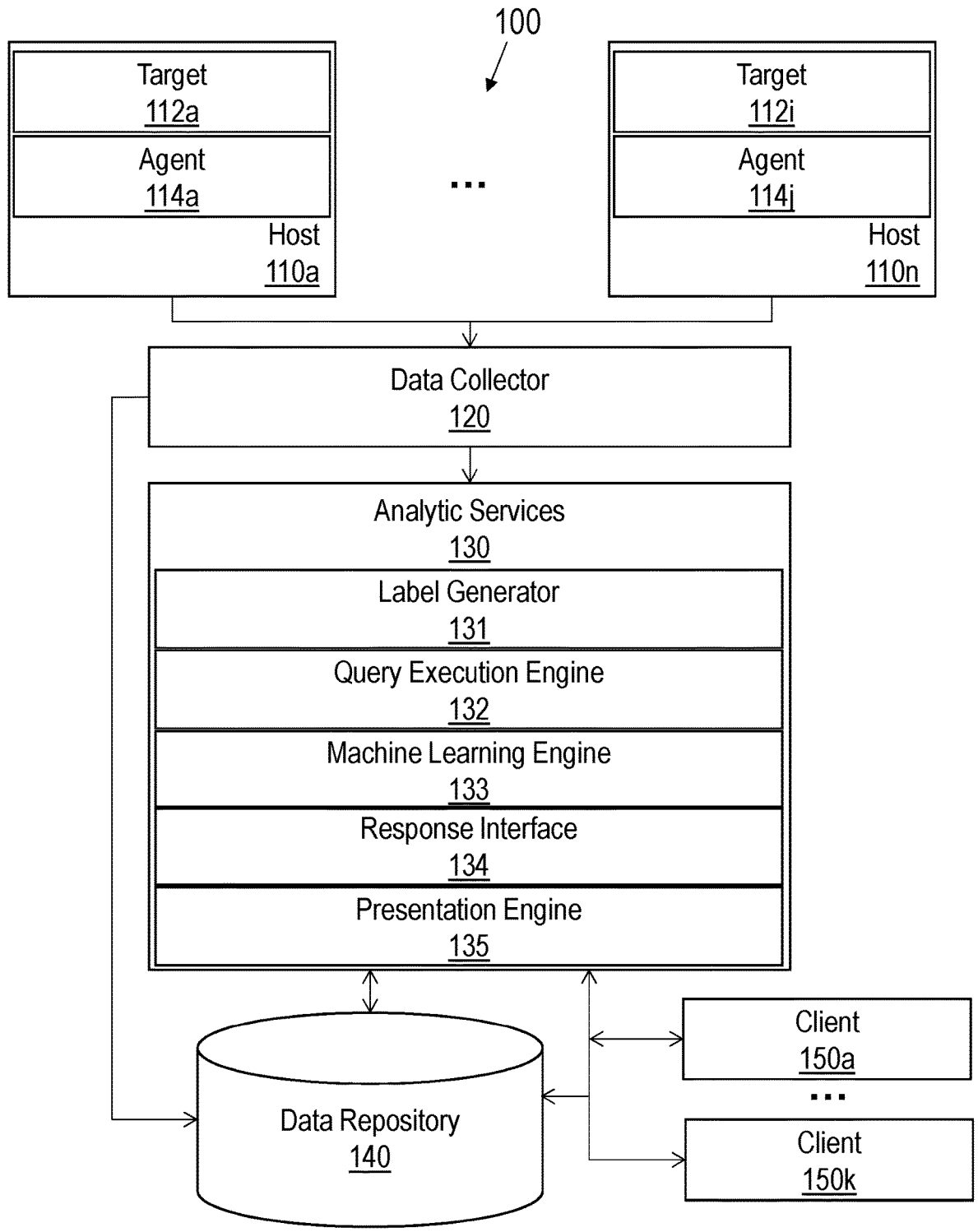
FIG. 1 illustrates a system for performing time series analysis on resource metric data in accordance with some embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. AUTOMATIC LABELING
4. CUSTOMIZABLE LABEL-BASED ANALYTICS
5. CONFIGURING OTHER AUTOMATED RESPONSES
6. ARTIFICIAL INTELLIGENCE INTEGRATION
7. COMPUTER NETWORKS AND CLOUD NETWORKS
8. MICROSERVICE APPLICATIONS
9. HARDWARE OVERVIEW
10. MISCELLANEOUS; EXTENSIONS

1. General Overview

Techniques for performing analytics using automatically generated labels for time series data and numerical lists are disclosed. In some embodiments, the techniques include assigning labels to data points that are descriptive of a pattern reflected by the data point relative to other data points in a time series. For example, a label may identify peaks, valleys, spikes, starting points for an upward trend, starting points for a downward trend, ending points for an upward trend, ending points for a downward trend, seasonal patterns, maxima, and/or minima within the particular window of time. Additionally or alternatively, other labels may be assigned. Additional examples are provided further below.

In some embodiments, a framework is provided through which analytic queries and rules may be defined as a function of the automatically-assigned labels. The framework may allow the labels to be used for a variety of operations such as constructing/assigning composite labels, correlating time series datasets, searching time series datasets, filtering data points, building baseline models, detecting anomalies, and setting up alerts.

The descriptive nature of the labels allows custom queries and rules to be quickly defined in a user-friendly manner without the need for complex programming. For example, a system may capture the following time series datasets:

Access Logs Status 500 Trend: Tracks the count of Hypertext Transfer Protocol (HTTP) Status 500 errors over a period of time; and GC Time Trend: Tracks the average time taken for a garbage collection for each time interval The system may automatically label data points in each of the time series datasets. With the descriptive labels, a rule may be generated as follows:

Define 'Outage Caused by High GC' as 'Spike' in 'Access Log Status 500 Trend" AND 'Peak' in 'GC Time Trend'

The rule above may be used to search for the event with the composite label 'Outage Caused by High GC'. The event is detected as a function of patterns in the automatically-assigned labels 'Spike' and 'Peak'. In particular, when the rule is evaluated, the system may search for spikes in 'Access Log Status 500 Trend' and peaks in 'GC time Trend' that overlap in time or that occur near in time (e.g., within a threshold window) to each other. If the event is detected, then a responsive action may be triggered, such as sending an alert to notify a user about the outage event, returning a set of search results that identifies where outage events caused by high garbage collection occurred, filtering out irrelevant time series data not related to the event, rendering a display that highlights detected outages, and/or configuring the computing resources to address the outage.

In some embodiments, the system may search vertically, horizontally, and/or some combination thereof for patterns in the automatically assigned labels. A vertical search in this context refers to a search across different time series datasets. The 'Outage Caused by High GC' rule defined above is an example of a vertical search, where the system searches for labels that co-occur across the 'Access Log Status 500 Trend' dataset and the 'GC time trend' dataset. A horizontal search scans for sequential patterns which may not necessarily co-occur in time. A sequential pattern may manifest as a series of two or more labels that happen in a particular order. A sequential pattern may occur in the same time series dataset and/or across different time series datasets. For example, a rule or query may be defined to search for a 'Spike' followed sequentially by a 'Gap' in the same or a different time series signal, which may be indicative of a resource outage. A combination may include searching for labels that co-occur vertically followed sequentially by other co-occurring labels.

In some embodiments, rules and queries may define filter values in conjunction with the automatically assigned labels. For example, the 'Outage Caused by High GC' rule may be modified as follows:

Define 'Outage Caused by High GC' as 'Spike' in 'Access Log Status 500 Trend" AND 'Peak' in 'GC Time Trend' if 'Peak'>100 ms.

In the above example, the rule requires the Peak in 'GC Time Trend' to be less than a threshold (in this instance 100 milliseconds although it may vary). The filter values may thus be used filter out insignificant peaks. Other example filters values may be specified as a function of the duration an individual label occurs (e.g., search for a 'Gap" label that lasts for a threshold duration), the duration between two labels (e.g., search for a 'Spike' followed by a 'Gap' within a threshold period of time), the magnitude of a data point assigned the label (e.g., search for a 'Peak' in processor utilization only if above a threshold), or some other function, which may be custom defined.

As previously mentioned, the framework may allow users to custom define queries and/or rules to search for patterns of automatically-assigned labels and trigger appropriate responses. Additionally or alternatively, the framework may provide an artificial intelligence platform through which the queries and/or rules may be automatically generated. Rather than define a query, a user may simply label the occurrence of an event. The AI platform may include a machine learning engine to learn patterns in the automatically-generated labels that occur at or around a user-labelled event. The machine learning engine may analyze vertical and/or horizontal patterns to identify statistically interesting points for relevant metrics and leads or lags, corresponding with the user's marking, before or after those interesting points. The machine learning engine may automatically generate a query/rule based on the learned patterns in the automatically generated labels that are predictive of or otherwise correlated with the user-generated labels. The machine engine may refine the query or rule as a user labels more examples of the event, which may reduce the margin of error in detecting the event in the future. The user may be given the option to further modify and refine the automatically generated rule/query and/or the sample points that led to formulating the rule/query.

One or more embodiments described in this Specification and/or recited in the claims may not be included in this General Overview section.

2. System Architecture

In some embodiments, systems described herein include software and/or hardware components configured to process time series signals. A time series signal comprises a sequence of values that are captured over time. The source of the time series data and the type of information that is captured may vary from implementation to implementation. For example, a time series may be collected from one or more software and/or hardware resources and capture various performance attributes of the computing resources from which the sample data points were collected. As another example, a time series may be collected using one or more sensors that measure physical properties, such as temperature, pressure, motion, traffic flow, physiological metrics or other attributes of an object or environment.

In some embodiments, systems described herein capture time series signals from multiple entities of an application. An entity in this context may correspond to a software resource, hardware resource, or some other component used in the functioning of an application. In some embodiments, an application follows a multi-tier or multilayered architecture. For example, a three-tier architecture may include a presentation tier for providing a user interface, an application tier for executing the core application logic, and a data tier for managing data access. Each tier may comprise one or more components that are logically and/or physically separated from other tiers. In the three-tier architecture, the presentation tier may comprise one or more web servers, the application tier one or more application servers, and the data tier one or more database servers. However, the number of tiers and the components deployed therein may vary from one implementation to the next.

In some embodiments, multiple time series may be generated for a single entity to track different metrics. As an example, for a given database server, one time series may track the number of active database sessions, a second may track the average query response times, and a third may track the average sequential data read times. As another example, for a given host, a first time series may track the central processing unit (CPU) utilization rate and a second may track the memory utilization rate. The number and types of metrics that are collected for each entity may thus vary from implementation to implementation.

FIG. 1 illustrates example system 100 for performing time series analysis on resource metric data in accordance with some embodiments. System 100 generally comprises hosts 110a-n, data collector 120, analytic services 130, data repository 140, and clients 150a-k. The components illustrated in FIG. 1 may be implemented in software and/or hardware. Each component may be distributed over multiple applications and/or machines. Multiple components may be combined into one application and/or machine. Operations described with respect to one component may instead be performed by another component.

Components of system 100 may be implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

Hosts 110a-n represent a set of one or more network hosts and generally comprise targets 112a-i and agents 114a-j. A "target" in this context refers to an entity or resource that serves as a source of time series data. For example, a target may be a software deployment such as a database server instance, middleware instance, or some other software resource executing on a network host. In addition or alternatively, a target may be a hardware resource, an environmental characteristic, or some other physical resource for which metrics may be measured and tracked.

In some embodiments, targets 112a-i are different entities that are used or otherwise part of an application. For example, targets 112a-i may include load balancers, web servers, software components, application servers, network hosts, databases, storage servers, and/or other computing resources used to provide an email application, social media application, or some other cloud-based service. The number and types of resources deployed may vary from one application to the next. Further, applications may evolve over time to add, upgrade, migrate, and/or remove resources.

Agents 114a-j comprise hardware and/or software logic for capturing time series measurements from a corresponding target (or set of targets) and sending these metrics to data collector 120. In some embodiments, an agent includes a process, such as a service or daemon, that executes on a corresponding host machine and monitors one or more software and/or hardware resources that have been deployed. In addition or alternatively, an agent may include one or more hardware sensors, such as microelectromechanical (MEMs) accelerometers, thermometers, pressure sensors, heart rate monitors, etc., that capture time series measurements of a physical environment and/or resource. Although only one agent and target is illustrated per host in FIG. 1, the number of agents and/or targets per host may vary from implementation to implementation. Multiple agents may be installed on a given host to monitor different target sources of time series data. In other cases, a single agent may monitor multiple resources locally on the same host or remotely across multiple hosts.

In some cases, agents 114a-j may be configured to capture data points at different times and/or sampling rates. For example, one agent may sample CPU performance on a host every ten minutes starting at 11:00 a.m. Another agent may sample active sessions on a database server every five minutes starting at 11:02 a.m. Thus, the sample data points from different entities may not be exactly aligned or sampled at the same interval, which allows for a more flexible and robust system. The sample values may be extracted from log records and/or other sources, depending on the implementation.

Data collector 120 includes logic for aggregating sample data captured by agents 114a-j into a set of one or more time series signals or data objects. Data collector 120 may store the time series data in data repository 140 and/or provide the time series data to analytic services 130. In one or more embodiments, data collector 120 receives data from agents 114a-j over one or more data communication networks, such as the Internet. Example communication protocols that may be used to transport data between the components illustrated within system 100 may include, without limitation, HTTP, simple network management protocol (SNMP), and other communication protocols of the internet protocol (IP) suite.

Data collector 120 may collect or generate timestamps for sample values in a time series. A timestamp for a sample value indicates the date and time at which the sample value was measured or otherwise observed. For example, CPU performance on a target host that is sampled every five minutes may have a sequence of timestamps as follows for the collected samples: August 16, 11:50 p.m., August 16, 11:55 p.m., August 17, 12:00 a.m., and August 17, 12:05 a.m. The sampling rate and manner in which the timestamp is encoded may vary from implementation to implementation.

Analytic services 130 provides a set of functionalities that may be invoked to automatically label time series datasets, search for patterns in the automatic labels, generate rules/queries, and and/or otherwise analyze/manage behavior exhibited by targets resources. Analytic services 130 may be executed by one or more of hosts 110a-n or by one or more separate hosts, such as a server appliance that is operated independently from the managed hosts. One or more of analytic services 130 may be integrated into a network service, such as a software-as-a-service (SaaS), web service, a microservice, or any other cloud service.

Analytic services 130 may include, but is not limited to, label generator 131, query execution engine 132, machine learning engine 133, response interface 134 and presentation engine 135. Analytic services 130 may include one or more additional services and/or may omit one or more of the depicted services depending on the particular implementation. Additionally or alternatively, the functions described with respect to one component may instead be performed by another component.

Label generator 131 is configured to receive one or more time-series datasets and to automatically assign labels to data points based on detected patterns. Label generator 131 may analyze a data point relative to other data points in a time series to determine if one or more labels should be assigned, as described further below.

Query execution engine 132 is configured to evaluate rules and/or queries that specify patterns of automatic labels for which to search. For example, query execution engine 132 may parse the query to identify the relevant dataset(s) targeted by the query and expressions that define the pattern for which to look. Query execution 132 may evaluate the query by loading the relevant portions of the datasets (e.g., time series sample data points within a prescribed window of time) and their associated labels. Query execution engine 132 may then search for labels and data points that satisfy the patterns defined by the query expression.

Machine learning engine 133 is configured to learn patterns in the automatically-generated labels. Machine learning engine 133 may automatically generate and refine queries based on the learned patterns, as described in further detail below.

Response interface 134 provides an interface through which automated responsive actions may be triggered based on the query execution results. In some embodiments, response interface 134 provides an application programming interface (API) through which one or more responsive actions may be invoked. Response interface 134 may interact with other components of system 100, such as targets 112*a-j*. For example, response interface 134 may provide functionality, such as via an API and communication protocols, through which a resource may be shutdown or restarted if the query detects a particular pattern of labels. As another example, response interface 134 may provide an interface through which a resource configuration may be modified, such as by installing a patch, adjusting resource settings, or migrating the resource to a different host. One or more responsive actions may be invoked through an interactive interface, such as a graphical user interface (GUI), or automatically based on the generated summaries.

Presentation engine 135 is configured to generate and present interfaces based on the executed queries. In some embodiments, presentation engine 135 may generate GUI objects for viewing, navigating, and drilling-down on one or more query results. Presentation engine 135 may automatically filter, sort, and/or otherwise organize data points within a time series as a function of the query results. Additionally or alternatively, presentation engine 135 may provide recommendations and interface objects for invoking actions addressing an event that was detected based on the pattern of labels.

In some embodiments, presentation engine 135 includes a frontend interface that allows clients 150*a-k* and/or other system components to invoke analytic services 130. Presentation engine 135 may render user interface elements and receive input via user interface elements. Examples of interfaces include a GUI, a command line interface (CLI), a haptic interface, a voice command interface, and an API. Examples of user interface elements include checkboxes, radio buttons, dropdown lists, list boxes, buttons, toggles, text fields, date and time selectors, command lines, sliders, pages, and forms.

Data repository 140 includes volatile and/or non-volatile storage for storing data within system 100. Example data that may be stored may include, without limitation, time series data, queries, rules, query results, machine learning model artefacts, and interface data. Data repository 140 may reside on a different host machine, such as a storage server that is physically separate from other components of system 100 or may be allocated from volatile or non-volatile storage on the same host machine.

Clients 150*a-k* represent one or more clients that may access analytic services 130 to generate, view, and navigate analytic results. Additionally or alternatively, clients 150*a-k* may invoke responsive actions and/or configure automated triggers via the interfaces described herein. A "client" in this context may be a human user, such as an administrator, a client program, or some other application instance. A client may execute locally on the same host as anomaly management services 130 or may execute on a different machine. If executing on a different machine, the client may communicate with anomaly management services 130 via one or more data communication protocols according to a client-server model, such as by submitting HTTP requests invoking one or more of the services and receiving HTTP responses comprising results generated by one or more of the services.

Additional embodiments and/or examples relating to computer networks are described below in Section 7 and Section 8, titled "Computer Networks and Cloud Networks" and "Microservice Applications", respectively.

3. Automatic Labeling

In some embodiments, label generator 131 receives, as input, a set of one or more time series datasets and outputs a set of labeled data points. A given data point may receive zero or more labels depending on whether the data points reflects a statistically or practically significant point in a particular pattern of interest. For example, a data point may be assigned the label 'Peak' if the data point significantly rises above other nearby data points or 'Begin Uptrend' if it is the lowest point leading to a Peak. Other example labels are provided further below. The output may include a mapping between a label and the data points to which the label was assigned.

In some embodiments, the input set of time series datasets provided to label generator 131 are represented as a list of named arrays, where each named array corresponds to a different time series dataset and includes a set of numerical values (e.g., sample measurements for a resource metric). For example, the time series dataset named 'Access Log Status 500 Trend' may include an array of sample values, where each sample value represents a count of HTTP Status 500 errors within a different sample interval of a given time window. The index for each sample value in the array may correspond to the timestamp identifying when the sample value was observed. An assigned label may be linked to the index or indices of the data points to which the data points were assigned.

Figure 2:
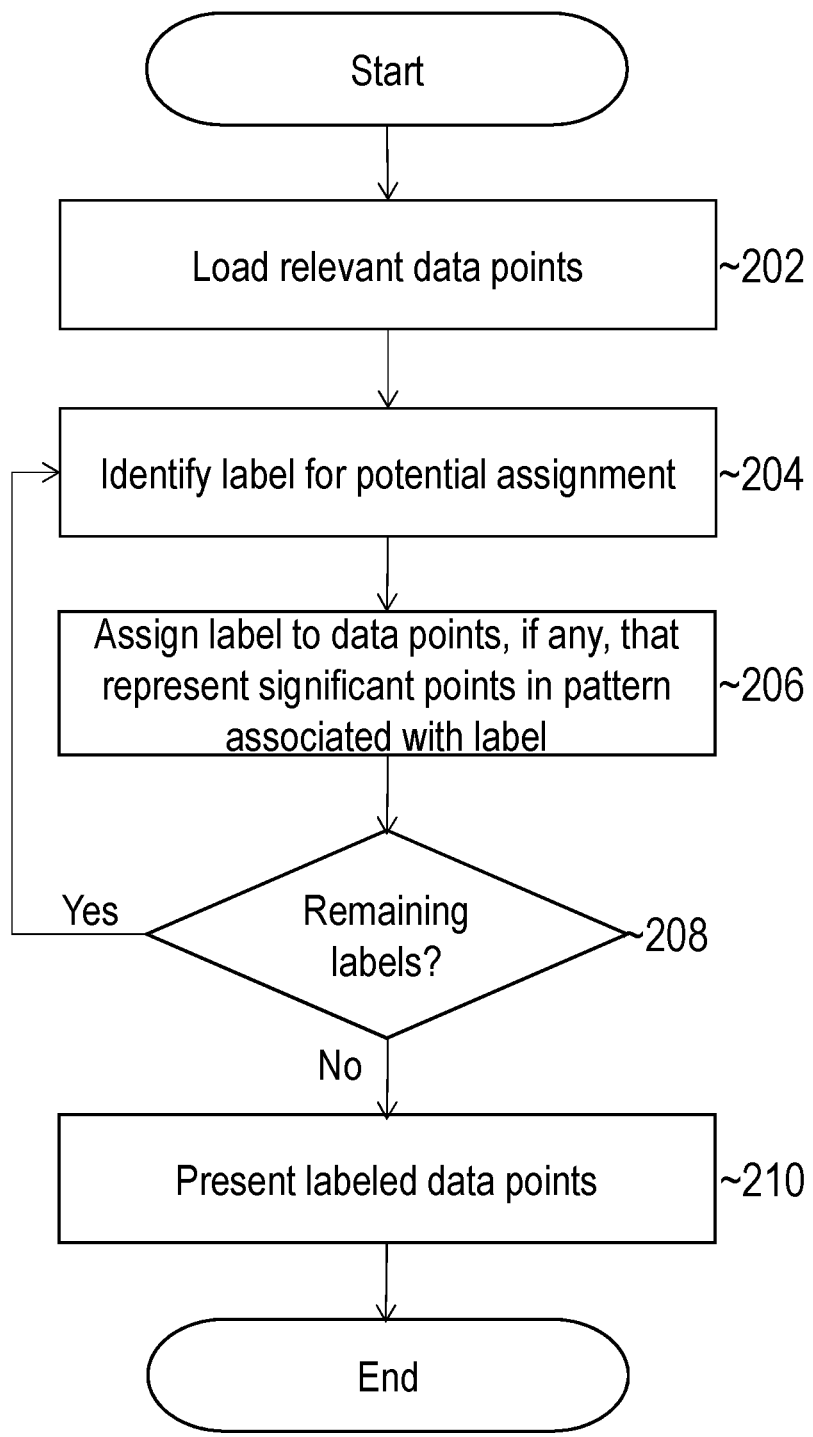
FIG. 2 illustrates an example set of operations for automatically assigning labels in accordance with some embodiments.

Responsive to receiving a list of named arrays, label generator 131 may analyze the values therein to assign the labels. FIG. 2 illustrates an example set of operations for automatically assigning labels in accordance with some embodiments. One or more operations illustrated in FIG. 2 may be modified, rearranged, or omitted. Accordingly, the particular sequence of operations illustrated in FIG. 2 should not be construed as limiting the scope of one or more embodiments.

The set of operations includes loading data points from one or more time series datasets into memory (operation 202). In some embodiments, the data points that are loaded are based on requests received from a user interface/presentation tier. For example, a user may request to view the 'Access Log Status 500 Trend' and 'GC time trend' dataset on a particular server over the past month or some other timeframe. The relevant data points in the specified window of time may then be loaded into memory for further processing.

In some embodiments, one or more sample values may be merged during the loading process, which may help streamline the labeling process and improve readability. For example, if a user is viewing a relatively lengthy window of time, assigning labels to individual raw samples might result in labels being too close together to view effectively within a given display. Two or more adjacent samples may be merged, such as by averaging or applying a smoothing function, into a single sample within an array to optimize the presentation. This approach may further reduce the number of data points that are processed and labeled.

In some embodiments, the process constructs time series on the fly from log fields extracted from raw log text. Raw log data is generally not readily available as an array of numbers from where the data originates. The process may construct the time series from the fields extracted from log text or from fields derived from these extracted fields by specifying in a query language which set of fields to parse for extracting the time series data. Constructing the time series may involve a significant amount of compute to query the log record fields, which may be significant in volume. Performance may be optimized by extracting the data points and constructing the time series in a distributed environment.

The set of operations further includes identifying a label for potential assignment (operation 204). In some embodiments, one or more labels may be selected by an end user for analysis. In other embodiments, the process may iterate through a list of one or more predefined labels. The label may be identified in any other way, depending on the particular implementation.

The set of operations further includes assigning the label to data points, if any, that represent significant points in a pattern described by the label (operation 206). For example, the label "Peak" may be assigned to one or more data points representing significant rises above other nearby data points. The pattern may be identified by performing a topological data analysis associated with the Peak label. As another example, a peak value may be assigned a "Significant Peak" label if the standard deviation of the magnitude of the peak exceeds a threshold value. Other labels may involve looking for other patterns, one or more of which may correspond to a unique statistical analysis relative to other labels, as described further below. If no data points conform to the pattern, then the process may proceed without assigning the label.

The set of operations further includes determining whether there are any other labels to analyze (operation 208). For example, the labeling process may iterate through a list of labels selected by a user or a set of predefined labels as previously indicated. If there are remaining labels, then the process returns to operation 204 and repeats for the next label in the set.

Once all labels have been processed, then the process presents the labeled data points (operation 210). Data points that have received a label may be highlighted or displayed in a different color to distinguish from data points that have not been labeled. Additionally or alternatively, differently labeled data points may be displayed in the same or a different color. The labels may be displayed above or otherwise near the corresponding data points to make it clear which points in a time-series are being referenced.

Figure 3A:
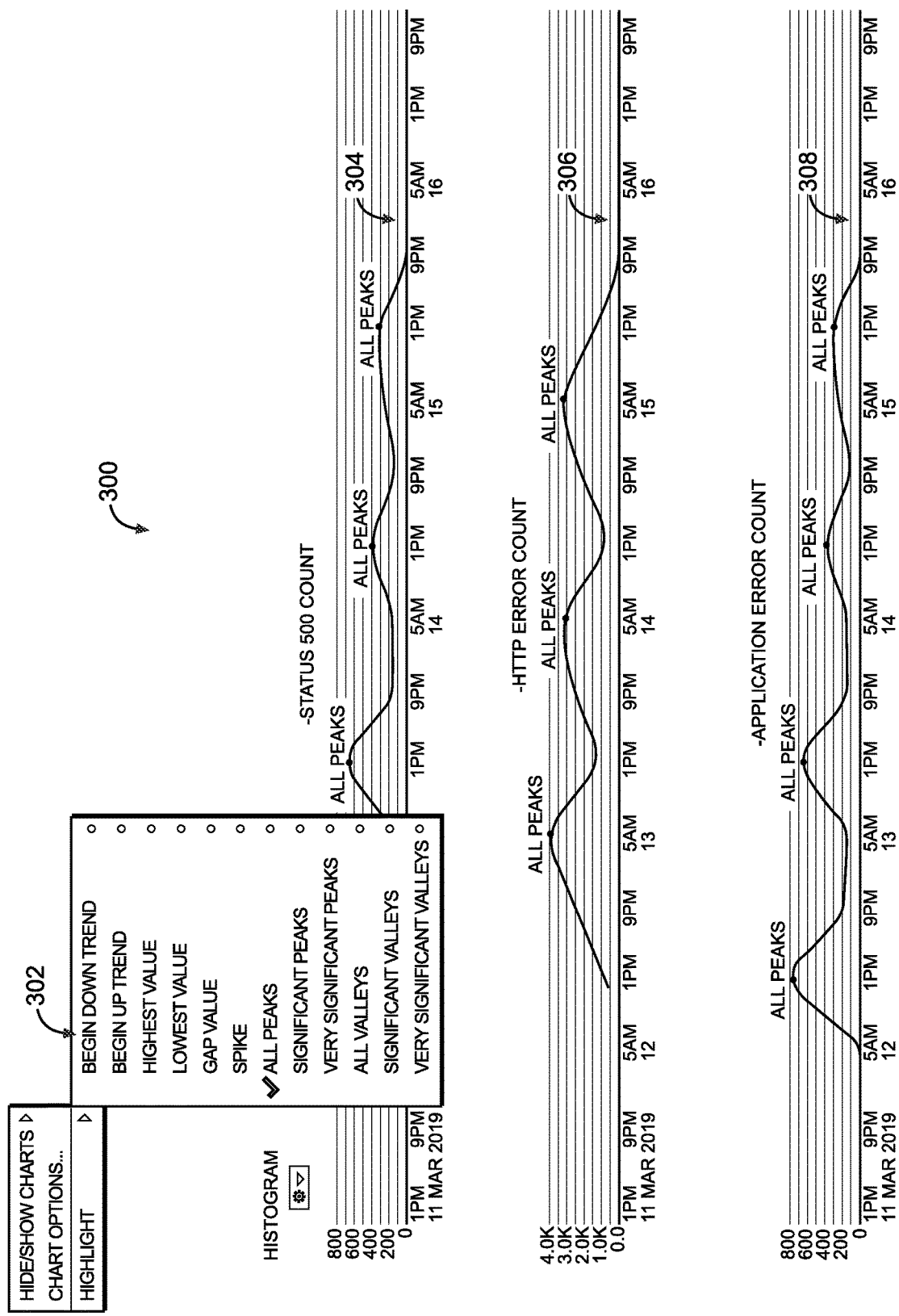
FIGS. 3A and 3B illustrate example interfaces for selecting and viewing labels in accordance with some embodiments.

FIG. 3A illustrates example interface 300 for selecting and viewing labels in accordance with some embodiments. Interface 300 includes menu 302, through which a user may select which labels to overlay/display on graphs 304, 306, and 308. The labels may be precomputed based on the current view of the user or may be computed as selected, depending on the particular implementation.

As illustrated, menu 302 includes the following automatically-generated labels:

Begin Downtrend: This label is assigned to the data point after a peak after which a climb down is detected.

Begin Uptrend: This label is assigned to the lowest data point on the way to a peak.

Highest Value: This label is assigned to the data point having the highest value in a time series dataset (e.g., the highest value in each of 'Status 500 Count', 'HTTP Error Count', and 'Application Error Count' currently displayed in graphs 304, 306, and 308, respectively).

Lowest Value: This label is assigned to the data point having the lowest value in a time series dataset (e.g., the lowest value in each of 'Status 500 Count', 'HTTP Error Count', and 'Application Error Count' currently displayed in graphs 304, 306, and 308, respectively).

Gap: This label is assigned to data points where no measurement was taken, which may be caused by a planned or unplanned outage.

Spike: This label is assigned to data points representing a sudden spike in the time series. A spike may be determined by analyzing for sudden changes in slopes that lead to a peak, where the slope is sharper than in an uptrend.

All Peaks: This label shows is assigned to data points representing peaks within a time series. A peak may be determined if it is the highest value relative to nearby neighbors. A time series may have multiple peaks (including significant peaks and very significant peaks) but only one highest value.

Significant Peak: This label is assigned to data points representing significant peaks within a time series. The threshold value for the standard deviation may be higher for this label than for nonsignificant peaks but lower than for very significant peaks. "Significance" in this context and those below may refer to statistical or practical significance. Statistical significance may occur when the difference between a predicted value and the observed value exceeds a threshold value. Practical significance may occur when the magnitude of a difference exceeds a threshold value.

Very Significant Peak: This label is assigned to data points representing peaks that are very significant statistically or practically. The threshold value for the standard deviation may be higher for this label than for significant peaks and other peaks.

All Valleys: This label is assigned to data points representing valleys within a time series. A valley may be determined if it is the lowest value relative to nearby neighbors. A time series may have multiple valleys (including significant valleys and very significant valleys) but only one lowest value.

Significant Valley: This label is assigned to data points representing significant valleys within a time. The threshold value for the standard deviation may be lower for this label than for nonsignificant valleys but higher than for very significant valleys.

Very Significant Valleys: This label is assigned to data points representing valleys that are very significant statistically or practically. The threshold value for the standard deviation may be lower for this label than for significant valleys and other valleys.

The above labels are nonlimiting examples of the automatic labels that may be assigned. In other implementations one or more of the labels may differ. For instance, the system may provide additional labels and/or omit existing labels. Each label may be tied to a different pattern/underlying statistical analysis of the data. It is further noted that a given data point may be assigned multiple labels. For example, the highest data point may be assigned the labels 'Highest Value', 'Very Significant Peak', and 'All Peaks'.

Other example labels may include, but are not limited to, burst and seasonal labels. A burst label may be used to classify multiple patterns that occur close to each other. Labels may be determined to be "close" in this context if they occur within a threshold period of time, a threshold number of times, and/or threshold number of labels from each other. For instance, the label 'Burst Peak' may indicate that two or more peaks occur next to each other within a relatively short timeframe (e.g., less than 1 second). The threshold may be exposed to and configurable by an end user. The burst label may also be used with other types of patterns, such as 'Burst Significant Peaks', 'Burst Valleys', etc., to classify groups of quickly recurring labels and corresponding data points.

Seasonal labels may be used to classify patterns that recur on a seasonal basis. For example, 'Weekly Very Significant Peak' may identify a series of 'Very Significant Peak' labels and corresponding data points that recur on a weekly or near weekly basis. As another example, 'Daily Valley' may identify valleys that substantially recur on a daily basis. Seasonal labels may further be used to identify seasonal bursts, such as 'Monthly Burst Spike', 'Weekly Burst Gap', etc.

The manner in which seasonal patterns are identified and classified may vary depending on the particular implementation. One approach is to execute an autocorrelation function whereby the linear relationships between a metric value $y_t$ and lagged metric values $y_{t-1}, y_{t-2} \ldots y_{t-n}$ are computed. When seasonality exists in the data with reference to metric value $y_t$, the autocorrelation is larger at multiples of the seasonal frequency between $y_t$ and the lagged metric values than for other lagged metric values. If seasonality is detected, then the data point $y_t$ and the correlated lagged metric values may be tagged with a 'Seasonal' label. Additionally or alternatively, the periodicity may be determined and these values may be tagged with a corresponding label (e.g., 'Hourly', 'Daily', 'Weekly', 'Monthly', etc.) As may be appreciated from the examples above, these labels may be appended to one or more other labels to form a composite label for the seasonal data points (e.g., 'Daily Valley', 'Monthly Burst Spike', etc.)

Figure 3B:
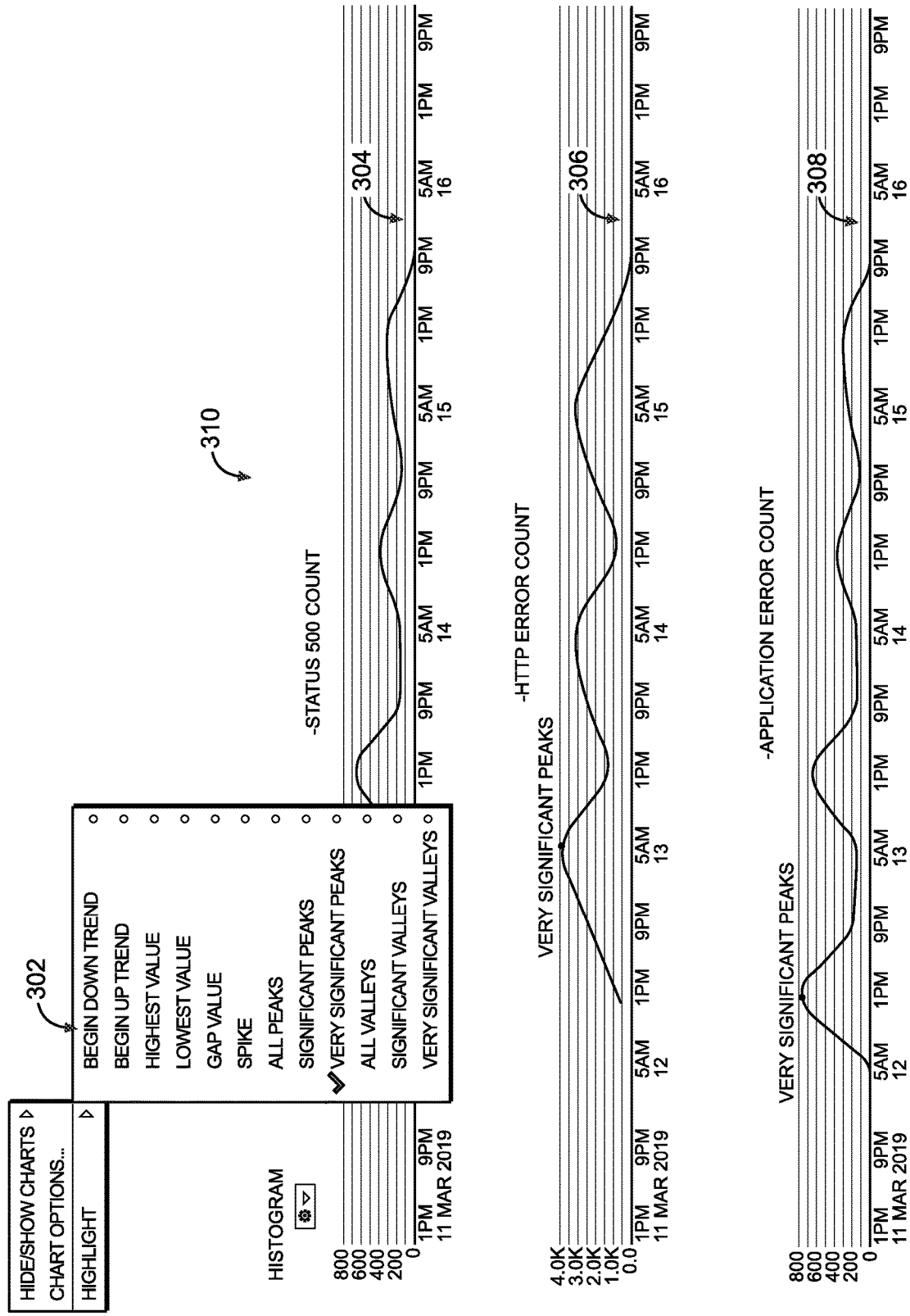

In some embodiments, interface 300 allows the user to toggle which labels are currently displayed. In interface 300, all peaks are shown across the different log metrics. FIG. 3B illustrates interface 310, which may be presented when the user selects very significant peaks. As can be seen, the 'All Peaks' label is removed and the 'Very Significant' Peaks overlaid, significantly reducing the number of labels displayed and highlighting the highest peaks in graphs 304, 306, and 308.

In some embodiments, interface 300 allows the user to zoom in and out on the presented timeseries (e.g., by scrolling, selecting a button, entering a custom timeframe). As previously mentioned, data points may be merged as the time window becomes longer. Conversely, the data points may be split as the user zooms in and the time window becomes smaller. In each case, the labeling process may be automatically re-executed to accommodate the change in data points as the user is zooming in/out. The user may thus see the labels shifting in real-time as the time window is being expanded, contracted, shifted, or otherwise changed. Further, new labels may be added and/or existing labels may be removed as the statistical analysis is re-executed on the merged or split datasets. For example, a 'Very Significant Peak' in one view may be relabeled as a 'Significant Peak' as the user zooms out. As another example, the 'Very Significant Peak' may be split into multiple data points that are labeled a 'Burst Peak' as the user zooms out.

4. Customizable Label-Based Analytics

The automated labels allow for flexible and custom analytics to be run on time series datasets. As previously mentioned, queries or rules may be defined as a function of one or more descriptive labels. The descriptive nature of the labels allows for queries and rules to be defined in an intuitive and user-friendly manner, without the need for complex programming.

FIG. 4 illustrates an example interface 400 for defining queries, in accordance with some embodiments. The example query 402 specifies the data source ('Log Source'='FA Custom Apps Server AccessLogs') and time series datasets to query ('Status 500 Count', 'HTTP Error Count', and 'Application Error Count'). The query establishes an alert event when the value of a data point for 'Status 500 Count' is greater than or equal to 50, there is a valley in the 'Application Error Count' time series and there is a peak in the 'HTTP Error Count' time series.

In some embodiments, a rule or query may assign a composite/custom-defined label to a particular pattern of automatically-assigned labels. The composite label may be descriptive of an event that is of interest to an end user, such as a server outage caused by garbage collection or a breach in quality of service guaranteed to a tenant of a cloud service. For instance, query 402 assigns the label 'Too Many 500 Errors' to the alert event. The composite label may be displayed on the time series for data points assigned the label in the same manner described in the section above.

Upon receiving a query, query execution engine 132 may evaluate the query expressions to search for matching time series data points. With reference to query 402, for example, query execution engine 132 may search for data points in 'Status 500 Count' within a window of time that are greater than or equal to 50. For each data point greater than or equal to 50, query execution engine 132 may next determine whether there is a co-occurring/overlapping valley in 'Application Error Count' and peak in 'HTTP Error Count' based on the automatic labels that have been assigned. In some embodiments, query execution engine 132 may require an exact overlap in time for a match to the query expression. In other implementations, query execution engine 132 may determine that the expressions are satisfied if the labels occur within a threshold time window of each other. Query execution engine 132 may then mark each instance of the event detected (i.e., those satisfying the query expressions) with the label 'Too Many 500 Errors'. The label may be mapped to the data points/indices in Status 500 Count', 'HTTP Error Count', and 'Application Error Count' where the event was detected.

In the example above, query execution engine 132 performed a vertical search based on a filter value (>=50) and two labels ('Peak' and 'Valley'). That is, query execution engine 132 searches for labels in different metrics that co-occurred and/or overlapped. As previously mentioned, query execution engine 132 may further be configured to perform horizontal searches. For example, query 402 may be modified such that the alert event is only marked if a 'Gap' is detected sequentially (e.g., with no intervening labels) in one or more of the time series datasets within a threshold period of time of a 'Peak' or a 'Valley'. As another example, query 402 may be modified such that the alert event is only marked if the same vertical conditions recur within a threshold time period. Thus, query execution engine 132 may be configured to identify patterns of labels/filter values that substantially co-occur across multiple time series datasets, patterns that occur sequentially, and/or patterns that occur within a threshold period of time.

In some embodiments, queries may be executed with reference to one or more baselines. A baseline in this context may comprise a sequence of labels for one or more time-series datasets that serves as a basis for comparison within a given window of time. In some embodiments, baselines may be constructed based on user-specified criteria or a user selection. For example, a user may have servers deployed in multiple datacenters distributed across various cities. The user may select one or more server metrics from the datacenter on a given day in one city to use as a baseline over a prescribed window of time. In response, system 100 may build the baseline as a function of labels automatically assigned to the one or more server metrics. In other embodiments, machine-learning techniques may be used to construct a baseline as described further below in Section 6, titled "Artificial Intelligence Integration".

Once built, a baseline may be the subject of one or more queries. For example, an application or other user may submit a query to compare the labels of a day of interest to a baseline day. As another example, a query may compare server metrics in one datacenter on a given day to a baseline from another city. The comparison may account for one or more of the following:

Similarities/differences in when labels occurred: Labels (e.g., 'Spike', 'Peak', etc.) in the baseline may occur at similar or different times then a time-series of interest.

Similarities/differences in the magnitude of labels: A given label may have substantially similar or divergent magnitude depending on the time series data set. For instance, a Peak in CPU usage in the baseline may be significantly lower or within a threshold range of similarity to a Peak in a time series of interest.

Similarities/differences in the periodicity of labels: A given label may that occurs seasonally in a time-series of interest may not occur seasonally in the baseline or with a different seasonal periodicity. Conversely, a label that occurs seasonally in the baseline may not occur seasonally in a time-series of interest.

Similarities and/or differences between the metric datasets of interest and the baseline may be highlighted in a GUI and/or returned as query results. For example, interface 300 may allow a user to view only labels that overlap in time with a baseline or that differ from a baseline. As another example, differences may be highlighted in a particular color to facilitate visualization and increase the speed of identification.

Queries on reference baselines may be used to perform a variety of analytics. For example, a given baseline may be constructed for a typical server outage. A query may be defined to monitor for similarities in labels between a target server and the baseline. An alert may be generated if there is significant overlap to prevent an outage or to provide preemptive warning and increase response times to an outage. As another example, baselines may be useful to help isolate the cause of performance degradation. If a server begins experiencing slow response times, a query may be constructed to search for differences in 'Spike' labels between server metrics in the current day and the baseline day. Normal spikes may be filtered out to reduce noise, allowing users to target unusual behavior and pinpoint the root cause of the problem.

Queries may account for any of the similarities and/or differences previously mentioned between one or more metrics and one or more corresponding baselines. For example, an alert may be set to trigger for a detected spike in a time-series of interest if and only if the spike is much greater than (e.g., more than a threshold value greater than) a spike in the baseline that tracks normal operating conditions. As another example, an alert may be set to trigger if and only if a spike in both garbage collection times and response times is within a threshold range or greater than a baseline that tracks a common outage condition. As may be appreciated, the queries that are defined and executed may vary significantly depending on the particular implementation.

In some embodiments, custom queries may be registered with presentation engine 135. Once registered, the queries may be accessible via a menu and/or other interface object. Users of the service may then select the query from the interface to run the query and identify relevant events. Additionally or alternatively, users may be able to set up alerts on the query through a response interface, as described further in the section below.

5. Configuring Automated Responses

In some embodiments, query execution engine 132 may trigger one or more automated responses, via response interface 135. Example responsive actions may include, but are not limited to, triggering alerts, rendering a display interface (e.g., a webpage or series of web pages), presenting recommended actions, starting a resource, stopping a resource, migrating a resource, deploying a resource, patching a resource, and/or otherwise configuring a resource.

FIG. 5 illustrates example interface 500 for establishing alerts, in accordance with some embodiments. Interface 500 includes fields for creating a new rule or selecting an existing rule to run periodically. For example, field 502 allows the user to specify a rule name, and other fields may allow the user to define patterns/query expressions as a function of filter values, operators, and automatically-assigned labels. Field 504 allows a user to specify the interval at which the query/rule is executed and any exclusions that may apply. Interface 500 may further allow the user to select or specify a baseline to use as a basis of comparison to newly received or other time series data of interest. Upon saving the search, the query is periodically executed according to the schedule. If the pattern/event is detected, then an alert may be triggered. The alert may be presented in the application interface and/or sent to a user, such as via email, short messaging service (SMS), social media, or some other means.

In some embodiments, the alerting interface may include a baseline, which may be reconfigurable. A baseline may affect how data points are labeled. For example, a data point may be labeled a spike if compared to other data points in a relatively short timeframe but might not be labeled a spike in a larger window. To increase configurability, a user may be allowed to adjust the baseline timeframe that is used for analysis when the query is periodically executed. For instance, a query that is scheduled to execute every hour may label data based on the most recent day, week, month's worth of data. Additionally or alternatively, other timeframes may also be selected.

In some embodiments, the one or more automated actions may be set to trigger based on baseline queries. For example, if both garbage collection times and response times on a server follow a baseline indicative of an outage, then one or more actions, such as restarting the server and/or routing requests to a new server, may be set to automatically trigger to preempt or ameliorate a server outage. The queries and associated actions may vary and be customizable by an end user. Queries may be mapped to action specifications or recipes as discussed further below. If the query conditions are satisfied, then the action specification may be invoked to perform the associated responsive actions.

In some embodiments, action specifications/recipe templates may be set to trigger in response to detecting an event. For example, if the alert 'Too Many 500 Errors' is detected, an action specification for addressing the event might be triggered. Example actions may include, but are not limited to, migrating incoming requests to a new server and restarting the afflicted server. Once restarted, then requests may again be routed to the previously afflicted server. Additionally or alternatively, action specifications/recipe templates may be defined to perform any of the other actions described herein, such as patching a server if performance degradation is detected in one or more metrics, adjusting configuration settings, etc.

6. Artificial Intelligence Integration

As previously mentioned, rather than define a query, a user may simply label the occurrence of an event. For example, a user may label example occurrences of 'Too many 500 errors' among a user interface, such as by marking a point (e.g., in a display similar to user interface 300) when the event occurred. Machine learning engine 133 may be configured to learn patterns in the automatically-generated labels that occur at or around a user-labelled event. The machine learning engine may analyze vertical and/or horizontal patterns to identify statistically interesting points for relevant metrics and leads or lags corresponding with the user's marking, before or after those interesting points. The machine learning engine may automatically generate a query/rule, such as query 402, based on the learned patterns in the automatically generated labels that are predictive of or otherwise correlated with the user-generated labels.

The manner in which machine learning engine learns patterns may vary from implementation to implementation. In some embodiments, machine learning engine may train one or more models using feature vectors. Different elements of a feature vector may indicate the presence or absence of a label across various time series. For example, given the reduced label set [Peak, Valley] and the time series datasets ['Status 500 Count', 'HTTP Error Count', and 'Application Error Count'], a feature vector as follows may be represented with the following features [Peak: Status 500 Count, Valley: Status 500 Count, Peak: HTTP Error Count, Valley: HTTP Error Count, Peak: Application Error Count, Valley: Application Error Count].

Example machine learning models that may be trained may include, classification models, regression models and/or artificial neural networks. Classification models may be trained to predict an event based on learned patterns in the automatic-labels. For example, the machine learning model may train a support vector machine, random forest, artificial neural network and/or other classification model to classify the event as occurring or not as a function of the feature vectors. Additionally or alternatively, regression models may be trained to make predictions based on numeric values. For example, a regression model may be trained to learn filter values and expressions that are predictive of a user-labelled event.

An estimation error for the model may be determined by making predictions and comparing the predictions to user labels or feedback that indicates whether the prediction was accurate. Multiple formulations of an automatically-generated query may be executed, and the one with the lowest margin of error may be selected for use. The selected query may then be used to automatically predict/label future occurrences of the event. A user may view and edit an automatically-generated query at any time.

In some embodiments, the labels may be used to train baselining and alerting models. For example, a user may configure alerting for one day worth of data. The user may configure a baseline based on a threshold, such as the past 30 days. The baseline model may then be trained from the past 30 days of data and used to annotate patterns on the $31^{st}$ day's data. For a faster response, the engine may precompute and store the 30 days of timeseries data in a compressed format. Thus, when the user submits queries from a UI, or during scheduled alerting, the system would not be querying from all the 31 days of raw log data to formulate the timeseries. The stored compressed baseline time series data may be reused for past 30 days. The system may then query raw logs for only the current day and combine them to find patterns. The baseline data may be periodically refreshed/updated in a sliding window style.

In some embodiments, the intervals for the timeseries may be computed and chosen automatically based on the time range of the query, which may improve readability and usability. For example, if the user queries for one hour of data, the interface may show the timeseries with a one minute interval, where as if the time range is two days, then the interface may automatically use an interval of one hour (or some other timeframe, which may be configurable by the user). The baseline data may be stored in very small intervals (e.g., one-minute intervals) to aggregate and produce a timeseries that matches the interval used in the actual query. Further, the interval that is used may change the labels/patterns that are detected as the data points subject to statistical analysis are adjusted.

7. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as HTTP. The requests are communicated through an interface, such as a client interface (such as a web browser), a program interface, or an API.

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to SaaS, Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID.

Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

8. Microservice Applications

According to some embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HTTP messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In some embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to some embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In some embodiments, a plugged-in microservice application may expose actions to the microservices manager. The exposed actions may receive, as input, data or an identification of a data object or location of data, that causes data to be moved into a data cloud.

In some embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In some embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

9. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 6 is a block diagram that illustrates computer system 600 upon which an embodiment of the invention may be implemented. Computer system 600 includes bus 602 or other communication mechanism for communicating information, and a hardware processor 604 coupled with bus 602 for processing information. Hardware processor 604 may be, for example, a general-purpose microprocessor.

Computer system 600 also includes main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes read only memory (ROM) 608 or other static storage device coupled to bus 602 for storing static information and instructions for processor 604. Storage device 610, such as a magnetic disk or optical disk, is provided and coupled to bus 602 for storing information and instructions.

Computer system 600 may be coupled via bus 602 to display 612, such as a cathode ray tube (CRT) or light emitting diode (LED) monitor, for displaying information to a computer user. Input device 614, which may include alphanumeric and other keys, is coupled to bus 602 for communicating information and command selections to processor 604. Another type of user input device is cursor control 616, such as a mouse, a trackball, touchscreen, or cursor direction keys for communicating direction information and command selections to processor 604 and for controlling cursor movement on display 612. Input device 614 typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a network line, such as a telephone line, a fiber optic cable, or a coaxial cable, using a modem. A modem local to computer system 600 can receive the data on the network line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

10. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    receiving a query that includes a composite label associated with an event, wherein the composite label is associated with a particular pattern of different labels that include at least a first label and a second label;
    responsive to receiving the query, executing at least one of a vertical or horizontal search for the particular pattern of different labels in a set of labels automatically assigned to data points in at least one time series;
    based on at least one of the vertical or horizontal search, identifying the particular pattern of labels associated with the composite label, wherein the particular pattern is identified based at least in part on at least one occurrence of a first label assigned to a first data point and a second label assigned to a second data point within a threshold number of labels from each other in the at least one time series; and
    responsive to identifying the particular pattern of labels associated with the composite label, triggering a responsive action.

2. The method of claim 1, wherein the composite label is a custom-defined label for an event affecting at least one computing resource.

3. The method of claim 1, wherein the query is executed periodically on newly received time series data to monitor for the event; wherein the query causes one or more labels automatically assigned to the newly received time series to be compared to one or more labels in a baseline.

4. The method of claim 3, wherein the query is executed on historical time series data to search for previous occurrences of the event.

5. The method of claim 1, wherein the at least one time series includes a first time series and a second time series, wherein the identifying the particular pattern includes determining that the first label occurs in the first time series within a threshold number of labels from the second label in the second time series.

6. The method of claim 1, wherein identifying the particular pattern further includes: determining that the first label occurs within a threshold amount of time with respect to the second label.

7. The method of claim 1, wherein identifying the particular pattern includes detecting an ordered sequence of labels that occur within at the at least one time series.

8. The method of claim 1, wherein the instructions further cause: receiving a set of user labels identifying a plurality of occurrences of the event; responsive to receiving the user labels, automatically learning the particular pattern of labels based on which labels occur at or nearest to occurrences of the events on a statistically significant basis.

9. The method of claim 8, wherein the instructions further cause: automatically generating the query based on the particular pattern of labels; and refining the query based on newly received user labels.

10. The method of claim 1, wherein the first label identifies at least one of a peak, valley, starting point for an upward trend, starting point for a downward trend, ending point for an upward trend, ending point for a downward trend, maximum, or minimum within a particular window of time.

11. The method of claim 1, wherein the instructions further cause: receiving a request to expand or contract the particular window of time; responsive to the request, automatically assigning at least one new label to a data point within the particular window of time that was not previously assigned to the data point.

12. The method of claim 1, wherein the responsive action includes generating an alert to notify a user of the event.

13. The method of claim 1, wherein the responsive action includes configuring a computing resource based on the event.

14. The method of claim 1, wherein the instructions further cause: training a machine learning model to learn patterns in automatically-assigned labels associated with the event, wherein the query is generated using the trained machine learning model.

15. The method of claim 14, wherein training the machine learning model includes using time series data within a sliding window of time series data to iteratively train a baseline model using labels assigned to data points within a threshold age.

16. The method of claim 14, wherein training the machine learning model includes generating feature vectors that indicate a presence or absence of different labels across various time series.

17. The method of claim 14, wherein the machine learning model is a neural network.

18. The method of claim 1 wherein the data points in the at least one time series are extracted from at least one log record.

19. A system comprising:
one or more hardware processors;
one or more non-transitory computer-readable media storing instructions that, when executed by the one or more hardware processors, cause the system to perform operations comprising:
receiving a query that includes a composite label associated with an event, wherein the composite label is associated with a particular pattern of different labels that include at least a first label and a second label;
responsive to receiving the query, executing at least one of a vertical or horizontal search for the particular pattern of different labels in a set of labels automatically assigned to data points in at least one time series;
based on at least one of the vertical or horizontal search, identifying the particular pattern of labels associated with the composite label, wherein the particular pattern is identified based at least in part on at least one occurrence of a first label assigned to a first data point and a second label assigned to a second data point within a threshold number of labels from each other in the at least one time series; and
responsive to identifying the particular pattern of labels associated with the composite label, triggering a responsive action.

20. One or more non-transitory computer-readable media storing instructions which, when executed by one or more hardware processors, cause performance of operations comprising:
receiving a query that includes a composite label associated with an event, wherein the composite label is associated with a particular pattern of different labels that include at least a first label and a second label;
responsive to receiving the query, executing at least one of a vertical or horizontal search for the particular pattern of different labels in a set of labels automatically assigned to data points in at least one time series;
based on at least one of the vertical or horizontal search, identifying the particular pattern of labels associated with the composite label, wherein the particular pattern is identified based at least in part on at least one occurrence of a first label assigned to a first data point and a second label assigned to a second data point within a threshold number of labels from each other in the at least one time series; and
responsive to identifying the particular pattern of labels associated with the composite label, triggering a responsive action.

\* \* \* \* \*